(12) United States Patent
Ota

(10) Patent No.: US 8,196,354 B2
(45) Date of Patent: Jun. 12, 2012

(54) GLASS RUN FOR MOTOR VEHICLE

(75) Inventor: Tomoki Ota, Aichi-ken (JP)

(73) Assignee: Toyoda Gosei Co., Ltd., Nishikasugai-gun, Aichi-ken (JP)

( * ) Notice: Subject to any disclaimer, the term of this patent is extended or adjusted under 35 U.S.C. 154(b) by 810 days.

(21) Appl. No.: 12/232,905

(22) Filed: Sep. 25, 2008

(65) Prior Publication Data

US 2009/0256398 A1    Oct. 15, 2009

(30) Foreign Application Priority Data

Sep. 27, 2007   (JP) ................................. 2007-252359

(51) Int. Cl.
  *B60J 10/02*   (2006.01)
(52) U.S. Cl. .......................................... 49/441; 49/479.1
(58) Field of Classification Search ................. 49/475.1, 49/479.1, 490.1, 440, 75.1, 490.141; 296/146.2
See application file for complete search history.

(56) References Cited

U.S. PATENT DOCUMENTS

| | | | | |
|---|---|---|---|---|
| 4,470,223 A | * | 9/1984 | Mesnel | 49/441 |
| 4,809,463 A | * | 3/1989 | Schroder et al. | 49/377 |
| 4,894,954 A | * | 1/1990 | Nozaki et al. | 49/479.1 |
| 4,951,418 A | * | 8/1990 | Keys | 49/440 |
| 5,086,588 A | * | 2/1992 | Nakano et al. | 49/441 |
| 5,365,698 A | * | 11/1994 | Nozaki | 49/441 |
| 5,503,700 A | * | 4/1996 | Dupuy | 156/245 |
| 5,635,274 A | * | 6/1997 | Chihara et al. | 428/122 |
| 6,487,820 B1 | * | 12/2002 | Nakajima et al. | 49/490.1 |
| 6,493,992 B2 | * | 12/2002 | Goto | 49/441 |
| 6,679,003 B2 | * | 1/2004 | Nozaki et al. | 49/441 |
| 6,942,278 B2 | * | 9/2005 | Shimizu | 296/146.9 |
| 6,964,133 B2 | * | 11/2005 | Aritake et al. | 49/479.1 |
| 6,996,936 B1 | * | 2/2006 | Maass | 49/479.1 |
| 7,294,386 B2 | * | 11/2007 | Murase et al. | 428/99 |

(Continued)

FOREIGN PATENT DOCUMENTS

JP    2-45820    3/1990

(Continued)

OTHER PUBLICATIONS

Japanese Office Action dated Sep. 26, 2011.

*Primary Examiner* — Katherine W Mitchell
*Assistant Examiner* — Justin Rephann
(74) *Attorney, Agent, or Firm* — McGinn IP Law Group, PLLC

(57) ABSTRACT

A glass run for use in a motor vehicle, of which corner sections are readily manufactured with excellent sealing properties. A main body of each of straight sections and corner sections of the glass run has an outer side wall, an inner side wall and a bottom wall, which define a generally U-shaped cross-section, and an outer seal lip and an inner seal lip are respectively provided in the outer side wall and the inner side wall. The straight sections and the corner sections are joined to each other via joints, and the inner side wall is formed greater than the outer side wall. A sub-seal rib is provided to protrude outwardly from an exterior surface of the outer side wall of each of the corner sections so as to face a position in which an end of the outer seal lip contacts the outer side wall when the door glass contacts the outer seal lip.

15 Claims, 3 Drawing Sheets

U.S. PATENT DOCUMENTS

| | | | |
|---|---|---|---|
| 7,533,495 B2 * | 5/2009 | Teramoto et al. | 49/441 |
| 7,698,856 B2 * | 4/2010 | Tamaoki et al. | 49/441 |
| 7,762,614 B2 * | 7/2010 | Kubo et al. | 296/146.2 |
| 2007/0028524 A1 * | 2/2007 | Hiramatsu et al. | 49/475.1 |
| 2009/0241431 A1 * | 10/2009 | Shibata et al. | 49/490.1 |

FOREIGN PATENT DOCUMENTS

| | | |
|---|---|---|
| JP | 9-286242 | 11/1997 |
| JP | 2004-106825 A | 4/2004 |
| JP | 2006-335295 A | 12/2006 |

* cited by examiner

GLASS RUN FOR MOTOR VEHICLE

CROSS-REFERENCE TO RELATED APPLICATION

This application is related to and claims priority from Japanese patent Application No. 2007-252359 incorporated herein by reference.

BACKGROUND OF THE INVENTION

1. Field of the Invention

The present invention relates to a glass run including straight sections and corner sections, which is attached to an inner periphery of a door frame of a motor vehicle to guide a door glass as it is raised and lowered.

2. Description of Related Art

As shown in FIG. 1, a glass run 10 is attached to an inner periphery of a door frame 12 of a vehicle door 14 for guiding a door glass 16 as it is raised and lowered.

As shown in FIG. 2, conventionally, the glass run 10 is fitted in a channel 18 of the door frame 12 to guide the door glass 16 upwardly and downwardly, and provide a seal between the door glass 16 and the door frame 12.

As shown in FIG. 3, the glass run 10 is generally formed by jointing extruded straight sections 20 adapted to be attached along an upper side portion, a front vertical side portion and a rear vertical side portion of the door 14, with corner sections 22, each being formed by molding, in conformity with corners 24 of the door frame 12.

A door weather strip (not shown) is attached to an outer periphery of a door panel and the door frame 12, and/or an opening trim weather strip (not shown) is attached to a flange provided in a door opening portion of a vehicle body, thereby sealing between the vehicle door 14 and the vehicle body.

As shown in FIG. 2, a main body of the straight section 20 of the glass run 10 includes an outer side wall 26, an inner side wall 28 and a bottom wall 30, and has a generally U-shaped cross-section. An outer seal lip 32 is provided to extend from an open end of the outer side wall 26 towards an interior of the main body of the glass run 10, and an inner seal lip 34 is provided to extend from an open end of the inner side wall 28 towards the interior of the main body of the glass run 10.

And an outer cover lip 36 and an inner cover lip 38 respectively extend from the open ends of the outer side wall 26 and the inner side wall 28 towards the bottom wall 30 along exterior surfaces of the outer side wall 26 and the inner side wall 28.

The outer side wall 26, the inner side wall 28 and the bottom wall 30 of the main body of the glass run 10 are inserted in the channel 18 provided in the door frame 12, and at least one part of an exterior surface of the respective walls is brought into pressure contact with an interior surface of the channel 18, thereby holding the glass run 10. The channel 18 is provided by bending the door frame 12 or attaching a door molding thereto.

The door glass 16 slides within the interior of the main body of the glass run 10 and is held such that both surfaces of a peripheral part thereof are sealed with the outer seal lip 32 and the inner seal lip 34 (see Japanese patent application laid-open No. Hei 9-286242, for example).

And, in order to hold the straight section 20 of the glass run 10 within the channel 18, the inner side wall 23 and the outer side wall 26 are respectively provided with an inner holding lip 40 and an outer holding lip 42 to seal gaps between the channel 18, the inner side wall 28 and the outer side wall 26.

In contrast, in the corner section 22 of the glass run 10, which is formed by molding, such holding lips as the inner holding lip 40 and the outer holding lip 42 that are provided in the straight section 20 are difficult to be formed, because corresponding area of the corner section 22 are in a so-called "undercut" state.

In addition, in the corner section 22 of the glass run 10, the channel 18 may be difficult to be provided.

Under the above circumstances, as shown in FIG. 2, a caulking member 44 may be inserted in an area adapted to hold a tip end of the door frame 12 with the outer side wall 26 and the outer cover lip 36, thereby ensuring sealing properties between the door frame 12 and the glass run 10.

In this case, however, troublesome works are required to insert the caulking member 44, and the caulking member 44 is additionally needed, thereby increasing production costs.

SUMMARY OF THE INVENTION

It is an object of the present invention to provide a glass run of which corner sections are readily formed with excellent sealing properties.

In order to achieve the above-described object, according to a first aspect of the present invention, there is provided a glass run for use in a motor vehicle, which is adapted to be attached along an inner periphery of a door frame of a vehicle door for guiding a door glass as it is raised and lowered, and the glass run has straight sections which are formed by extrusion and adapted to be attached to an upper side portion and a vertical side portion of the door frame, and corner sections which are formed by molding to join the straight sections to each other, and adapted to be attached to corners of the door frame. The straight sections and the corner sections respectively include a main body having an outer side wall, an inner side wall and a bottom wall, which define a generally U-shaped cross-section. An outer seal lip and an inner seal lip respectively extend from open ends of the outer side wall and the inner side wall into an interior defined by the outer side wall, the inner side wall and the bottom wall, thereby respectively sealing inner and outer surfaces of the door glass. The outer side wall, the inner side wall, the bottom wall, the outer seal lip and the inner seal lip of the straight section are respectively joined to the outer side wall, the inner side wall, the bottom wall, the outer seal lip and the inner seal lip of the corner section via joints, and a sub-seal rib is provided to protrude outwardly from an exterior surface of the outer side wall of the corner section so as to face a position in which an end of the outer seal lip contacts the outer side wall when the door glass contacts the outer seal lip.

In accordance with the first aspect of the present invention, the straight sections and the corner sections respectively include a main body having an outer side wall, an inner side wall and a bottom wall, which define a generally U-shaped cross-section, and an outer seal lip and an inner seal lip respectively extend from the open ends of the outer side wall and the inner side wall into an interior defined by the outer side wall, the inner side wall and the bottom wall, thereby respectively sealing outer and inner surfaces of the door glass.

With this arrangement, when the door is closed, in the upper side portion, vertical side portions and corners of the door frame, a peripheral end of the door glass can be accommodated within the main body of the glass run, which has an outer side wall, an inner side wall and a bottom wall to define a generally U-shaped cross-section, so that the door glass can be held securely. In addition, as the door glass is raised and lowered, in the upper side portion, vertical side portions and corners of the door frame, the outer seal lip and the inner seal lip contact the door glass to provide a seal between the door frame and the door glass.

The outer side wall, the inner side wall, the bottom wall, the outer seal lip and the inner seal lip of the straight section are respectively joined to the outer side wall, the inner side wall, the bottom wall, the outer seal lip and the inner seal lip of each of the corner sections via joints. Therefore, the vertical straight section and upper side straight section of the glass run are respectively joined to the corner section, thereby ensuring sealing properties and sound-shielding properties in the joints between the straight sections and the corner section.

A sub-seal rib is formed to protrude outwardly from an exterior surface of the outer side wall of the corner section so as to face a position in which an end of the outer seal lip contacts the outer side wall when the door glass contacts the outer seal lip. Therefore, when the door glass is closed, the sub-seal rib of the outer side wall can be pressed against the door frame or the channel by the door glass and the outer seal lip. Consequently, a seal between the outer side wall and the door frame or the channel can be effected so that no caulking member is needed.

It is preferable that the sub-seal rib has a cross-sectional shape of which an exterior surface is tapered on the side of the bottom wall of each of the corner sections.

With this arrangement, the cross-sectional shape of the sub-seal rib is formed to have a tapered exterior surface on the side of the bottom wall so that when the glass run is attached to the door frame, a tip end of the door frame or the channel slides along the exterior surface of the outer side wall without being blocked with the tapered exterior surface of the sub-seal rib, whereby smooth insertion thereof becomes possible.

It is preferable to form an outer cover lip so as to extend from the open end of the outer side wall along an exterior surface thereof, and form an inner cover lip so as to extend form the open end of the inner side wall along an exterior surface thereof.

With this arrangement, a tip end of a door outer panel is held with the outer side wall and the outer cover lip, whereas a tip end of a door inner panel is held with the inner side wall and the inner cover lip. Therefore, the glass run can be strongly secured to the door frame.

It is preferable to form an outer holding lip in an exterior surface of the outer side wall of the straight section, and form an inner holding lip in an exterior surface of the inner side wall of the straight section for contacting the door frame or the channel.

With this arrangement, in the straight section of the glass run, by virtue of the outer holding lip and the inner holding lip, the outer side wall and the inner side wall can be securely fitted in the door frame or the channel, and securely sealed against the door frame or the channel.

It is preferable to form a longitudinal end of the outer holding lip of the straight section and a longitudinal end of the sub-seal rib of the corner section are both formed in the joint between the outer side wall of the straight section and that of the corner section in an overlapped state.

With this arrangement, in the joint between the outer side wall of the straight section and that of the corner section, the outer holding lip and the sub-seal rib provide a double seal to prevent interruption of a sealing line, thereby ensuring good sealing properties.

It is preferable to provide a sliding member which exhibits low sliding properties on a surface of each of the outer seal lip, the inner seal lip and the bottom wall of the straight section, which is adapted to contact the door glass.

With this arrangement, when the door glass enters and slides in an interior of the main body of the straight section of the glass run, the sliding resistance against the outer seal lip and the inner seal lip can be reduced to ensure smooth rising and lowering of the door glass.

As described above, since the sub-seal rib is formed to protrude outwardly from the exterior surface of the outer side wall of the corner section so as to face the position in which the end of the outer seal lip contacts the outer side wall when the door glass contacts the outer seal lip, the sub-seal rib of the outer side wall can be pressed against the door frame or the channel by the door glass and the outer seal lip. Consequently, a seal between the outer side wall and the door frame or the channel can be effected so that no caulking member is needed.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Figure 1:
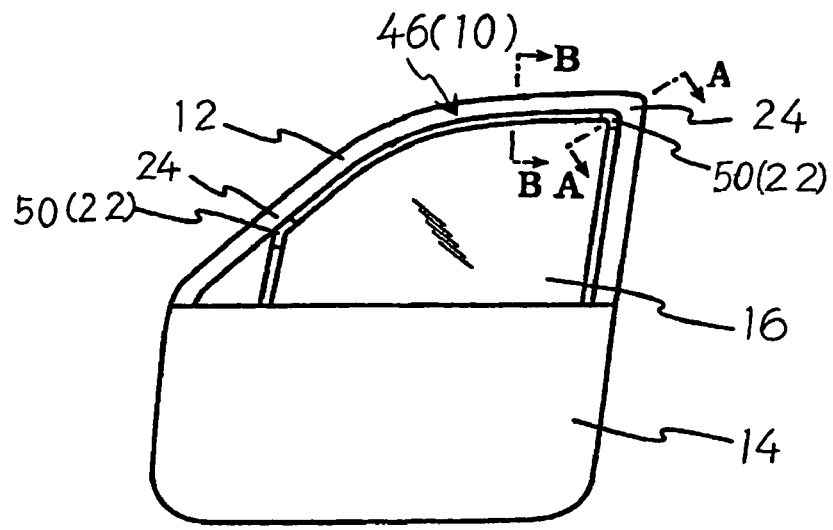
FIG. 1 is a front view of a door of a motor vehicle.
Figure 2:
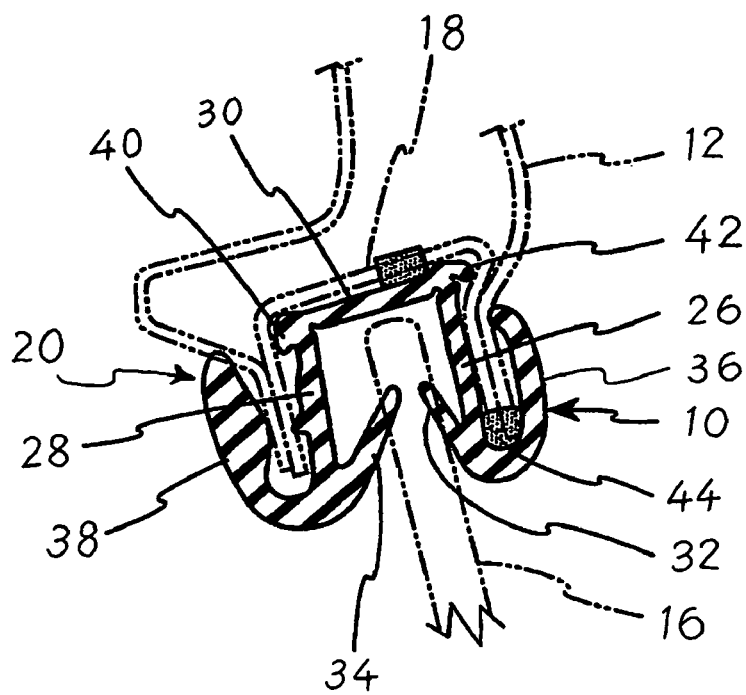
FIG. 2 is a cross-sectional view which shows a conventional glass run that is attached to a straight portion of a door frame.
Figure 3:
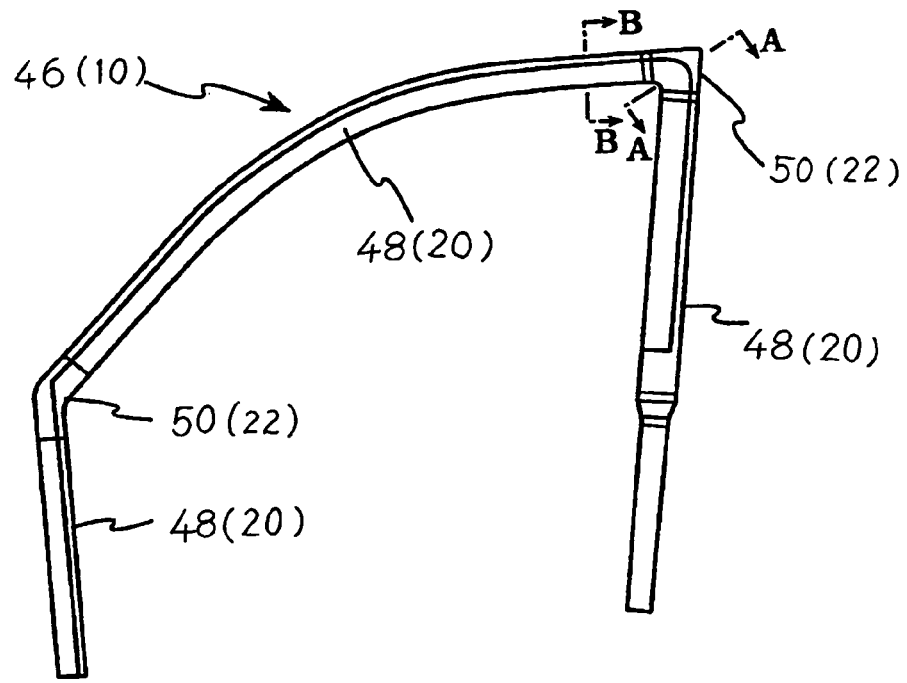
FIG. 3 is a front view of one embodiment of a glass run in accordance with the present invention.

One embodiment of the present invention will be explained with reference to FIG. 1 and FIGS. 3 through 5. FIG. 1 is a front view of a door 14 of a motor vehicle. FIG. 3 is a front view of a glass run 46 for a front door, which is to be attached to a door frame 12 of the door 14. As shown in FIG. 1, the door frame 12 is provided in an upper part of the door 14, and a door glass 16 is raised and lowered therealong. The glass run 46 is attached along an inner periphery of the door frame 12 to guide the door glass 16 as it is raised and lowered, and provide a seal between the door glass 16 and the door frame 12.

As shown in FIG. 3, the glass run 46 includes straight sections 48 which are formed by extrusion, and corner sections 50 which are formed by molding to join the extruded straight sections 48 to each other in conformity with corners 24 of the door frame 12.

The extruded straight sections 48 are attached to an upper side portion, a rear vertical side portion and a division sash as a front vertical side portion of the door frame 12, respectively.

In order to conform these extruded straight sections 48 to the door frame 12, the corner sections 50 are formed by molding to join the straight sections 48 to each other. The corner sections 50 of the glass run 46 are attached to the corners 24 of the door frame 12.

Hereinafter, the present embodiment will be explained based on the straight section 48, which is adapted to be attached to the upper side portion of the door frame 12, and the corner section 50, which is adapted to be attached to the rear corner 24 of the door frame.

Figure 4:
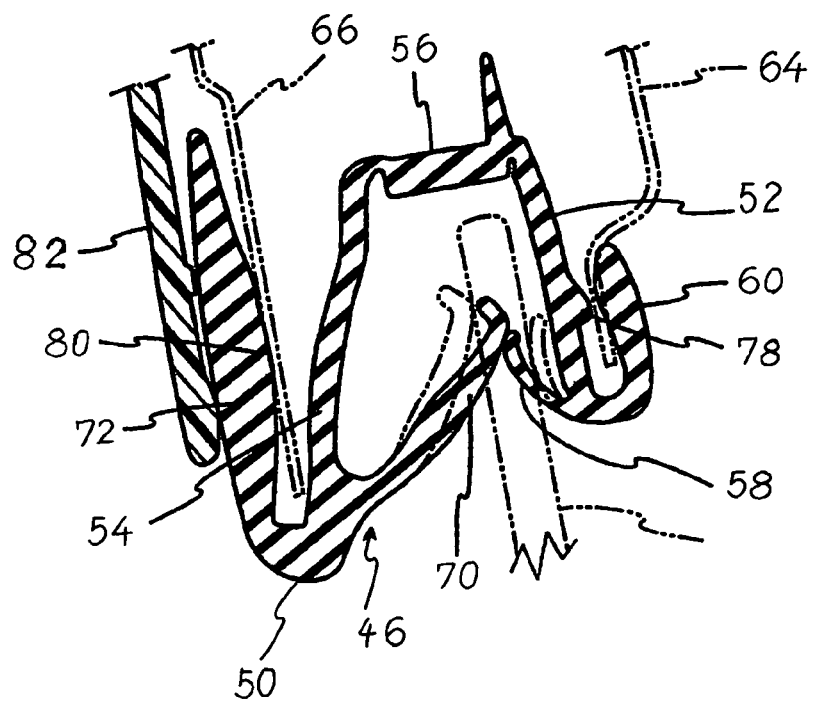
FIG. 4 is a cross-sectional view of one embodiment of a glass run in accordance with the present invention, taken along line A-A of FIGS. 1 and 3, which is attached to a corner of a door frame.
Figure 5:
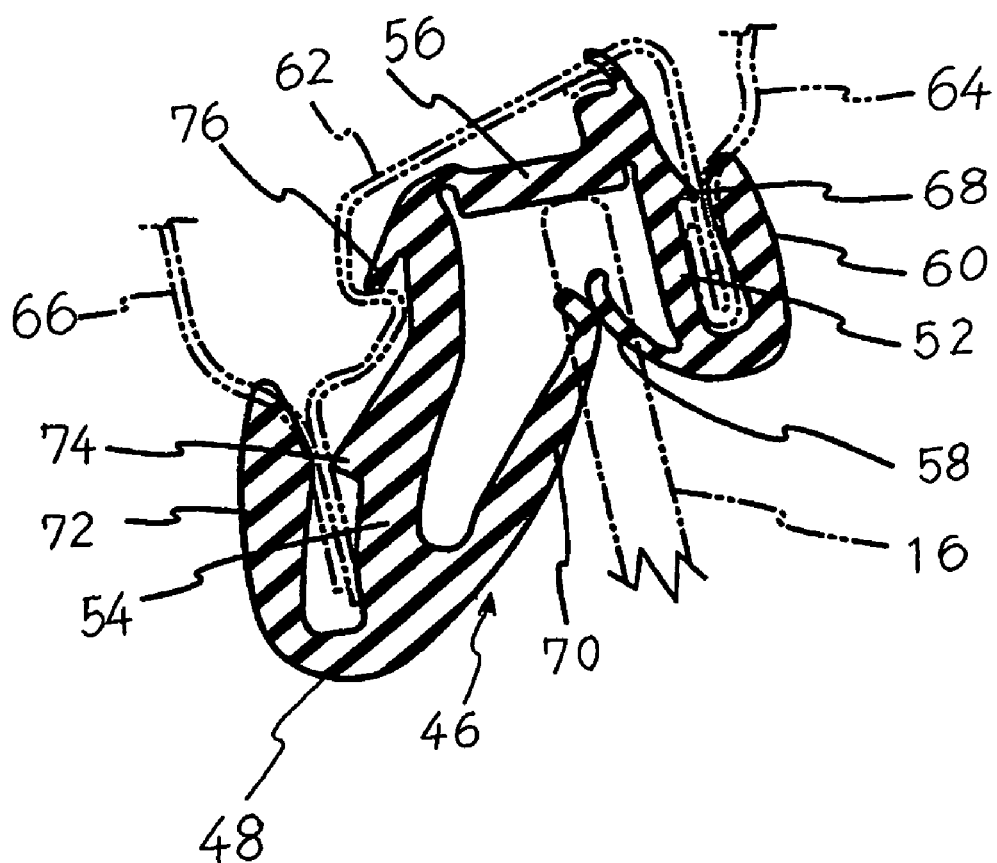
FIG. 5 is a cross-sectional view of one embodiment of a glass run in accordance with the present invention, taken along line B-B of FIGS. 1 and 3, which is attached to a straight portion of a door frame.

FIG. 4 is a cross-sectional view of the corner section 50 of the glass run 46, which is taken along line A-A of FIGS. 1 and 3, and FIG. 5 is a cross-sectional view of the straight section 48 in the upper side portion of the glass run 46, which is taken along line B-B of FIGS. 1 and 3.

First, the straight section 48 will be explained, and next, the corner section 50 will be explained.

As shown in FIG. 5, the straight section 48 of the glass run 46 includes a main body composed of an outer side wall 52, an inner side wall 54 and a bottom wall 56. The inner side wall 54 is formed to have a width and a thickness greater than those of the outer side wall 52. The thus arranged main body has an unsymmetrical cross-section of which an inner half is greater than an outer half thereof.

The main body of the glass run 46 has a substantially identical cross-section in the straight section adapted to be attached to the upper side portion of the door frame 12 and the straight section adapted to be attached to the vertical side portion thereof.

The outer side wall 52 of the glass run 46 has a generally plate-shaped cross-section. An outer seal lip 58 extends from an open end of the outer side wall 52 towards an interior of the main body of the glass run 46. And an outer cover lip 60 extends from the open end of the outer side wall 52 along an exterior surface thereof parallel thereto. The outer cover lip 60 covers a tip end of a channel 62. The channel 62 is joined to each of a tip end of a door outer panel 64 and a tip end of a door inner panel 66 to have a generally U-shaped cross-section, and the glass run 46 is held within the channel 62.

An outer holding lip 68 projects from the exterior surface of the outer side wall 52 on the side of the bottom wall 56, and contacts the channel 62. By virtue of the outer holding lip 68, the outer side wall 52 can be fitted in the channel 62 securely, and a gap between the outer side wall 52 and the channel 62 can be sealed.

As described above, the outer seal lip 58 extends to the interior of the main body of the glass run 46 inside the outer side wall 52.

When the door glass 16 is raised, and an upper end thereof enters the interior of the main body of the glass run 46, the outer seal lip 58 and a later-describing inner seal lip 70 elastically contact both surfaces of the upper end of the door glass 16 to provide a seal between the upper end of the door glass 16 and the door frame 12.

In the straight section 48 of the glass run 46, which is adapted to be attached to the vertical side portion of the door frame 12, a plurality of ridges can be formed on a surface of the outer seal lip 58, which contacts the door glass 16 and faces an opening of the main body of the glass run 46, so as to extend in a longitudinal direction thereof. These ridges are formed simultaneously with the extrusion of the main body of the glass run 46. Instead of the ridges, a later-describing sliding material which exhibits low sliding properties can be formed on a surface of the outer seal lip 58.

With this arrangement, when the door glass 16 is raised and lowered to slide in the glass run 46 attached to the vertical side portion of the door frame 12, the contacting area and friction resistance between the door glass 16 and the glass run 46 decrease to reduce the sliding resistance, and consequently, the generation of noise can be prevented, and smooth rising and lowering of the door glass 16 can be ensured. In addition, when the door glass 16 shifts outwardly or flexes to be strongly pressed against the outer seal lip 58 due to curving of the door glass 16 and generation of negative pressure during running of a vehicle, smooth rising and lowering of the door glass 16 can be ensured without increasing the sliding resistance thereof.

Where a sliding member which exhibits low sliding properties is provided on a surface of the inner seal lip 70, which is adapted to contact the door glass 16, this sliding member is formed by extruding a material which exhibits a low sliding resistance such as a thermoplastic elastomer containing olefin in a higher ratio on the surface of the inner seal lip 70 by a thickness of about 0.1 mm, simultaneously with the extrusion thereof, or applying a coating of a sliding member which exhibits low sliding properties, such as urethane resin, etc. With this arrangement, when the door glass 16 slides within the glass run 46, the sliding resistance therebetween can be reduced, whereby generation of noise as well as variations in the attachment position of the glass run 46 can be prevented.

Furthermore, ridges may be formed on an interior surface of the outer side wall 52 and a reverse surface of the outer seal lip 58, or the above-described sliding member which exhibits low sliding properties may be formed thereon by extrusion, applying or bonding. In this case, even when the outer seal lip 58 is pushed with the door glass 16 to contact the outer side wall 52 closely, the outer seal lip 58 can be prevented from adhering to the outer side wall 52.

The bottom wall 56 is formed into a generally plate-shaped configuration, and is provided with depressions in joints to the outer side wall 52 and the inner side wall 54, respectively, to facilitate flexing thereof.

A sliding member which exhibits low sliding properties is formed on an interior surface of the bottom wall 56 by extrusion, similarly to the outer seal lip 58 and the inner seal lip 70, or a sliding member which exhibits low sliding properties, such as urethane resin, etc., is applied thereto. With this arrangement, the sliding resistance against the door glass 16 can be reduced.

The inner side wall 54 is formed thicker and wider than the outer side wall 52. With this arrangement, the glass run 46 can be held with a side surface of the door frame 12.

An inner cover lip 72 extends from an open end of the inner side wall 54 on the inner side of the inner side wall 54 parallel thereto. The inner cover lip 72 and the inner side wall 54 hold a tip end of the door inner panel 66 and the other tip end of the channel 62.

The inner seal lip 70 obliquely extends from the open end of the inner side wall 54 towards the interior of the main body of the glass run 46. The inner seal lip 70 is formed longer and thicker than the outer seal lip 58 so that when the door glass 16 enters the interior of the glass run 46, the door glass 16 can be shifted to the outside position, thereby reducing a level difference between the door frame 12 and the door glass 16. Consequently, air resistance and wind noises can be reduced, and preferable aesthetic designing characteristics is ensured.

A first inner holding lip 74 is formed on an exterior surface of the inner side wall 54 on the side of the open end thereof, and a second inner holding lip 76 is formed in the vicinity of the joint between the inner side wall 54 and the bottom wall 56. The channel 62 of the door frame 12 has two recesses for fitting the first inner holding lip 74 and the second inner holding lip 76 therein. With this arrangement, the glass run 46 can be held with the door frame 12.

Next, the rear corner section 50 of the glass run 46 will be explained with reference to FIG. 4. No channel is provided for attaching the rear corner section 50 to the door frame 12.

As shown in FIG. 3, the rear corner section 50 of the glass run 46 is provided by joining an extruded straight section 48 defining an upper side section, and another extruded straight section 48 defining a rear vertical section to each other by molding. The cross-sectional shape of the rear corner section 50 is approximately the same as that of the extruded straight section 48. Namely, the main body of the rear corner section 50 has a generally U-shaped cross-section, which is composed of an outer side wall 52, an inner side wall 54 and a bottom wall 56. In the corner section 50, the cross-sectional shape of the upper side section is gradually changed to that of the rear vertical side section.

An outer seal lip 58 extends from an open end of the outer side wall 52 towards an interior of the main body of the glass run 46. And an outer cover lip 60 extends from the open end of the outer side wall 52 along an exterior surface thereof parallel thereto. A tip end of the door outer panel 64 is held with the outer side wall 52 and the outer cover lip 60, similarly to the straight section 48.

The outer side wall 52, the inner side wall 54 and the bottom wall 56 of the straight section 48 are respectively joined to corresponding portions of the corner section 50 via joints. Therefore, the vertical side section and the upper side section of the glass run 46 are jointed to the corner section 50, thereby ensuring sealing properties and sound-shielding properties around the joints of the corner section 50.

A sub-seal rib 78 projects outwardly from the position of the exterior surface of the outer side wall 52, which faces the position in which the tip end of the outer seal lip 58 contacts the outer side wall 52 when the door glass 16 contacts the outer seal lip 58.

With this arrangement, when the door glass 16 is raised to its closed position, the outer side wall 52 can be pressed against the tip end of the door outer panel 64 of the door frame 12 with the door glass 16 and the tip end of the outer seal lip 58. Consequently, the sub-seal rib 78 is strongly pressed against the interior surface of the door outer panel 64, whereby in the corner section 50, the outer side wall 52 can be sealed against the door outer panel 64. As a result, no caulking member is needed between the outer side wall 52 and the outer cover lip 60.

The sub-seal rib 78 of the corner section 50 and the outer holding lip 68 of the straight section 48 are both formed in the joint between the outer side wall 52 of the straight section 48 and that of the corner section 50. Therefore, in the joint between the outer side wall 52 of the straight section 48 and that of the corner section 50, the outer holding lip 68 and the sub-seal rib 78 provide a double seal, whereby good sealing properties can be ensured without generating any seal interruption.

It is preferable that the sub-seal rib 78 has a cross-section of which a bottom-side surface is formed into a tapered surface. With this arrangement, when the glass run 46 is attached to the door frame 12, the tip end of the door outer panel 64 is inserted between the outer side wall 52 and the outer cover lip 60 while sliding on the exterior surface of the outer side wall 52. At this time, the tip end of the door outer panel 64 can slide on the tapered surface formed in the sub-seal rib 78 so that the door outer panel 64 can be inserted smoothly without being blocked therewith.

The inner seal lip 70 is provided to extend from an open end of the inner side wall 54 towards the interior of the main body having a generally U-shaped cross-section, and the inner cover lip 72 is provided to extend from the open end of the inner side wall 54 inside the same parallel thereto. The inner cover lip 72 and the inner side wall 54 hold a tip end of the door inner panel 66 to attach the rear corner section 50 to the door frame 12.

The inner cover lip 72 may be provided with a protrusion 80 which protrudes towards the inner side wall 54. A garnish 82 is provided inside the inner cover lip 72 in contact with the same to press the inner cover lip 72 against the door inner panel 66. At this time, the protrusion 80 of the inner cover lip 72 contacts the door inner panel 66 to hold the inner cover lip 72 and the garnish 82.

In order to form the straight sections 48 of the glass run 46, a synthetic rubber such as an EPDM rubber, or a thermoplastic elastomer such as a polyolefin elastomer, etc. is used as the material thereof.

Where the synthetic rubber is used, after extruded, it is heated for vulcanizing in a vulcanization chamber with a hot air, high frequency wave, etc. Where the thermoplastic elastomer is used, it is cooled for solidifying. Then, the resultant material is cut to obtain extruded members, each having a predetermined length.

Next, the corner section 50 of the glass run 46 is molded by cutting the thus obtained extruded members to predetermined dimensions at generally right angles to the longitudinal direction thereof, placing cut ends of the extruded members in a mold, and injecting a solid material in a cavity of the mold. The molded corner section 50 has a generally identical cross-section to that of each of the extruded members. It is preferable that the material for the molded members is of the same kind as the material for the extruded members. Where the thermoplastic elastomer is used, the material is in a molten state when injected into the mold so that the molded member is integrally welded to the extruded members with heat and pressure thereof.

Where the straight sections 48 are formed of an EPDM rubber, it is preferable to form the corner section 50 of an EPDM rubber or a thermoplastic olefin elastomer. Where the straight sections 48 are formed of a thermoplastic olefin elastomer, it is preferable to form the corner section 50 of a thermoplastic olefin elastomer. In this case, they are the materials of the same kind so that the straight sections 48 and the corner section 50 exhibit good adhesion properties. And they are both the olefin-based materials to exhibit good weather resistance, and they can be subjected to simultaneous pulverizing treatment so that manufactured products can be readily recycled. Where the thermoplastic olefin elastomer is used, no vulcanization treatment is required to facilitate manufacturing of products.

Where the synthetic rubber is used, it is vulcanized by injecting it in a mold and heating the mold. At this time, the extruded members and the molded member are composed of an identical material or materials of the same kind so as to be bonded to each other by vulcanization, whereby they can be integrally secured to one another.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A glass run for use in a motor vehicle, which is adapted to be attached along an inner periphery of a door frame of a vehicle door for guiding a door glass as it is raised and lowered, said glass run comprising:
   straight sections which are formed by extrusion and adapted to be attached to an upper side portion and vertical side portions of the door frame; and
   corner sections which are formed by molding to join said straight sections to each other, and adapted to be attached to corners of the door frame,
   wherein said straight sections and said corner sections respectively include a main body comprising an outer side wall, an inner side wall, and a bottom wall, which define a generally U-shaped cross-section, wherein an outer seal lip extends from an open end of said outer side wall and an inner seal lip extends from an open end of said inner side wall to project in an interior defined by said outer side wall, said inner side wall and said bottom wall, thereby respectively sealing outer and inner surfaces of the door glass, wherein said outer side wall, said inner side wall, said bottom wall, said outer seal and said inner seal lip of each of said straight sections are respectively joined to said outer side wall, said inner side wall, said bottom wall, said outer seal lips, and said inner seal lip of each of said corner sections via joints, wherein said outer side wall of each of said corner sections comprises a sub-seal rib which protrudes outwardly from an exterior surface of said outer side wall in a position of said exterior surface of said outer side wall that is located across a position of an interior surface of said outer side wall in which an end of said outer seal lip contacts said outer side wall when the door glass contacts said outer seal lip, wherein a contact point of said end of said outer seal lip and said interior surface of said outer side wall and a contact point of a top of said sub-seal rib and said exterior surface of said outer side wall are located on a same straight line which is at a right angle to said outer side wall.

2. A glass run as claimed in claim 1, wherein said sub-seal rib has a cross-sectional shape of which an exterior surface is formed tapered on a side of said bottom wall of each of said corner sections.

3. A glass run as claimed in claim 1, wherein each of said straight sections and said corner sections further includes an outer cover lip which extends from said open end of said outer side wall along said exterior surface of said outer side wall, and an inner cover lip which extends from said open end of said inner side wall along an exterior surface of said inner side wall.

4. A glass run as claimed in claim 3, further comprising:
a garnish provided on the inner cover lip to press the inner cover lip against an interior of a panel of the frame door.

5. A glass run as claimed in claim 4, wherein the inner cover lip is provided with a protrusion which protrudes toward the inner side wall, the protrusion contacting the interior of the panel of the frame door to hold the inner cover lip and the garnish.

6. A glass run as claimed in claim 1, wherein each of said straight sections further includes an outer holding lip and an inner holding lip for contacting one of the door frame and a channel provided in the door frame, which are respectively provided to project from said exterior surface of said outer side wall and an exterior surface of said inner side wall.

7. A glass run as claimed in claim 6, wherein a longitudinal end of said outer holding lip of each of said straight sections and a longitudinal end of said sub-seal rib of each of said corner sections are both formed where said outer side walls of each of said straight sections connects with each of said corner sections.

8. A glass run as claimed in claim 1, wherein a sliding member which exhibits low sliding properties is provided on a surface of each of said bottom wall, said outer seal lip, and said inner seal lip of each of said straight sections to contact the door glass.

9. A glass run as claimed in claim 1, wherein a length of the inner seal lip is greater that a length of the outer seal lip.

10. A glass run as claimed in claim 7, wherein a thickness of the inner seal lip is greater that a thickness of the outer seal lip.

11. A glass run as claimed in claim 1, wherein said sub-seal rib presses said outer side wall to seal a contact area between said outer side wall and an interior surface of an outer panel of the frame door.

12. A glass run as claimed in claim 1, wherein the straight sections comprise an EPDM (ethylene propylene diene monomer) rubber, and the corner sections comprise a thermoplastic olefin elastomer.

13. A glass run as claimed in claim 1, wherein a width of the inner side wall is greater than a width of the outer side wall.

14. A glass run as claimed in claim 13, wherein a thickness of the inner side wall is greater than a thickness of the outer side wall.

15. A glass run as claimed in claim 1, further comprising a plurality of ridges formed on the interior surface of said outer side wall and a surface of the outer seal lip to prevent the outer seal lip from adhering to the outer side wall.

* * * * *